(12) United States Patent
Chen

(10) Patent No.: US 7,018,061 B2
(45) Date of Patent: Mar. 28, 2006

(54) BACKLIGHT MODULE AND LIGHT GUIDE PLATE THEREOF

(75) Inventor: Ga-Lane Chen, Fremont, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 3 days.

(21) Appl. No.: 10/832,648

(22) Filed: Apr. 26, 2004

(65) Prior Publication Data

US 2004/0212984 A1 Oct. 28, 2004

(30) Foreign Application Priority Data

Apr. 25, 2003 (TW) .............................. 92109680 A

(51) Int. Cl.
*F21V 8/00* (2006.01)
(52) U.S. Cl. ........................................................ 362/31
(58) Field of Classification Search .................. 362/31, 362/561
See application file for complete search history.

(56) References Cited

U.S. PATENT DOCUMENTS

| 5,999,685 | A | 12/1999 | Goto et al. |
| 6,139,162 | A | 10/2000 | Masaki |
| 6,224,223 | B1 * | 5/2001 | Higuchi et al. ............. 362/618 |
| 6,264,343 | B1 * | 7/2001 | Miyashita et al. .......... 362/600 |
| 6,628,352 | B1 * | 9/2003 | Sumida et al. ................. 349/61 |
| 6,644,823 | B1 * | 11/2003 | Egawa et al. ................ 362/609 |

* cited by examiner

*Primary Examiner*—Laura K. Tso
(74) *Attorney, Agent, or Firm*—Wei Te Chung

(57) ABSTRACT

A backlight module (3) includes a light source (31), a light cover (32), and a light guide plate (33). The light guide plate includes an incident surface (333), an emitting surface (331), and a bottom surface (335) opposite to the emitting surface for scattering and reflecting the light beams input by the light source. The light beams are directed by the bottom surface to the emitting surface. A plurality of stairway-shaped protrusions (332) are uniformly located on the emitting surface. The stairway-shaped protrusions can efficiently improve the modulation transfer function of the light guide plate, and increase the brightness of the backlight module.

18 Claims, 6 Drawing Sheets

BACKLIGHT MODULE AND LIGHT GUIDE PLATE THEREOF

BACKGROUND OF THE INVENTION

1. Field of the Invention

The present invention relates to a backlight module and light guide plate thereof, and particularly to a high brightness backlight module and light guide plate thereof.

2. Description of Related Art

Conventional backlight modules for use in rear projection displays such as liquid crystal displays are classified into two types, the edge-type and the direct type, depending upon the position of the light sources in the displays. Edge-type backlight modules are usually used in liquid crystal displays because they save space due to their thinness.

One conventional edge-type backlight module has a structure as shown in FIG. 9. In this figure, the conventional backlight module 1 includes a light source 11, a light cover 12, a light guide plate 13, a reflective sheet 14, and a brightness enhancing film 15.

The light guide plate 13 comprises an incident surface 131 for receiving incident light emitted from the light source 11, a bottom surface 132 with a large number of fine dots 134 for reflecting and diffusing the incident light, and a top surface 133 for emitting light. The brightness enhancing film 15 has a plurality of micro-lens structures 151 disposed uniformly on its surface, which tend to collimate the light emitted from the top surface 133 of the light guide plate 13 toward a direction of a liquid crystal panel.

However, in the conventional backlight module 1 as described above, since a plurality of discrete elements are used, the light emitted from the light source to the liquid crystal panel passes through a number of light interfaces, so light energy is lost. Further, the backlight module is expensive due to the high cost of the brightness enhancing film used therein.

To solve the above problems, a backlight module 2 shown in FIG. 10, is described in U.S. Pat. No. 5,999,685. The backlight module 2 includes a light source 21, a light cover 22, and a light guide plate 23, wherein the light guide plate 23 comprises a bottom surface 233 with a number of printed-dots thereon (not shown) and a top surface 231 with a plurality of V-shaped grooves 232 therein. The V-shaped grooves 232 commonly have a vertex angle of 60 to 120 degrees, with the most effective vertex angle being 90 degrees.

The light guide plate 23 with the V-shaped grooves 232 combines the functions of the light guide plate 13 and the brightness enhancing film 15 of the FIG. 9 prior art, thereby avoiding use of the expensive brightness enhancing film 15, and decreasing the amount of elements in the module. The structure shown in FIG. 10, therefore, can cost less than the structure shown in FIG. 9 since the brightness enhancing film 15 is eliminated.

Usually, the light guide plate 23 is formed using the steps of: kneading liquid material; injecting the liquid material into a mold at high pressure using an injection molding machine; allowing the injected material to solidify by cooling; and extracting the light guide plate from the mold. A light guide plate having a shape corresponding to that of the mold is thus obtained.

However, in practice, controlling a precise vertex angle of the V-shaped grooves 232 to be 60–120 degrees as extracted from the mold, is difficult, and it is difficult to get the surfaces of the grooves to be smooth. Thus the brightness of the backlight module 2 is impaired.

SUMMARY OF THE INVENTION

An object of the present invention is to provide a backlight module having a high brightness, which is in low cost, and which is efficiently uses light energy.

In order to achieve the object set forth, a backlight module in accordance with one embodiment of the present invention comprises a light guide plate and at least one light source, wherein, the light guide plate comprises at least one incident surface for receiving light beams, an emitting surface, and a bottom surface opposite to the emitting surface for scattering and reflecting said light beams. A plurality of stairway-shaped protrusions are disposed on the emitting surface or the at least one incident surface. The at least one light source is provided adjacent to the at least one incident surface.

Other objects, advantages and novel features of the invention will become more apparent from the following detailed description when taken in conjunction with the accompanying drawings.

DETAILED DESCRIPTION OF THE INVENTION

Figure 1:
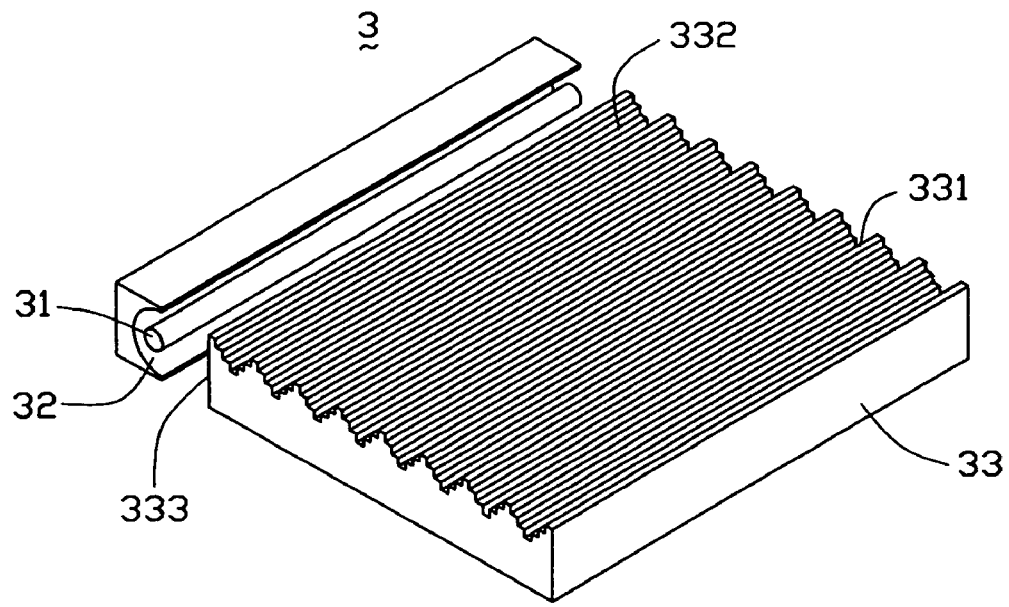
FIG. 1 is a perspective view of a backlight module according to a first embodiment of the present invention.
Figure 2:
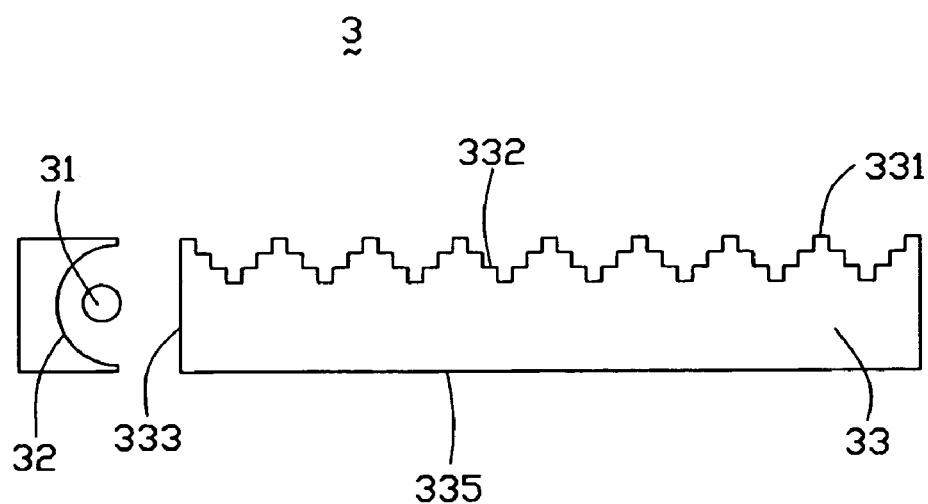
FIG. 2 is a side view of the backlight module in FIG. 1.

FIGS. 1 and 2 are respectively a perspective view and a side view of a backlight module according to a first embodiment. The backlight module 3 comprises a light source 31, a light cover 32, and a light guide plate 33, wherein, the light guide plate 33 includes an incident surface 333, an emitting surface 331, and a bottom surface 335 opposite to the emitting surface 331 and orthogonal to the incident surface 333.

Further, a plurality of stairway-shaped protrusions 332 are uniformly located on the emitting surface 331. Each stairway-shaped protrusion 332 consists of several rectangular steps for collimating the light beams emitted away from the central area of the emitting surface 331. The stairway-shaped protrusions 332 efficiently improve the modulation transfer function (referred as to the MTF) of the light guide plate 33, and increase the brightness of the backlight module 3. The widths of the rectangular steps of the protrusions 332 should be uniform, or should gradually increase as a distance between the protrusions 332 and the light incident surface increases.

In use, the light source 31 is positioned adjacent the incident surface 333 of the light guide plate 33 to emit light beams thereto, and the light guide plate 33 receives and directs the light beams to the emitting surface 331. The stairway-shaped protrusions 332 on the emitting surface 331 collimate the light beams, and guide them out of the light guide plate 33.

Figure 3:
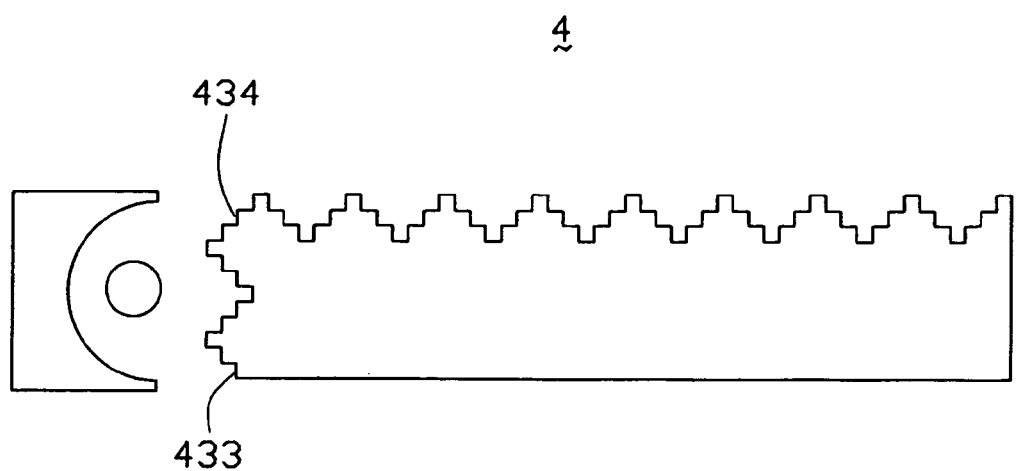
FIG. 3 is a side view of a backlight module according to a second embodiment of the present invention.

FIG. 3 illustrates a side view of a backlight module 4 according to a second embodiment. Compared with the backlight module 3 of FIG. 2, the backlight module 4 further comprises a plurality of stairway-shaped protrusions 434 uniformly located on an incident surface 433. The stairway-shaped protrusions 434 mate with the stairway-shaped protrusions on the emitting surface and can far improve the MTF of the light guide plate.

Figure 4:
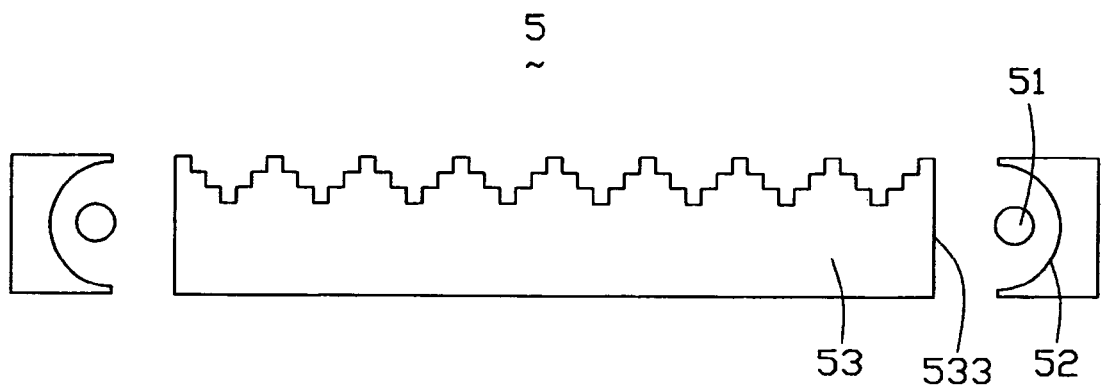
FIG. 4 is a side view of a backlight module according to a third embodiment of the present invention.

FIG. 4 illustrates a side view of a backlight module 5 according to a third embodiment. Compared with the backlight module 3 of FIG. 2, the backlight module 5 comprises two light sources 51 and two light covers 52, and a light guide plate 53. The light guide plate 53 includes an incident surface 533 on each of two opposite ends thereof. The light sources 51 are positioned facing to the corresponding incident surfaces 533.

Figure 5:
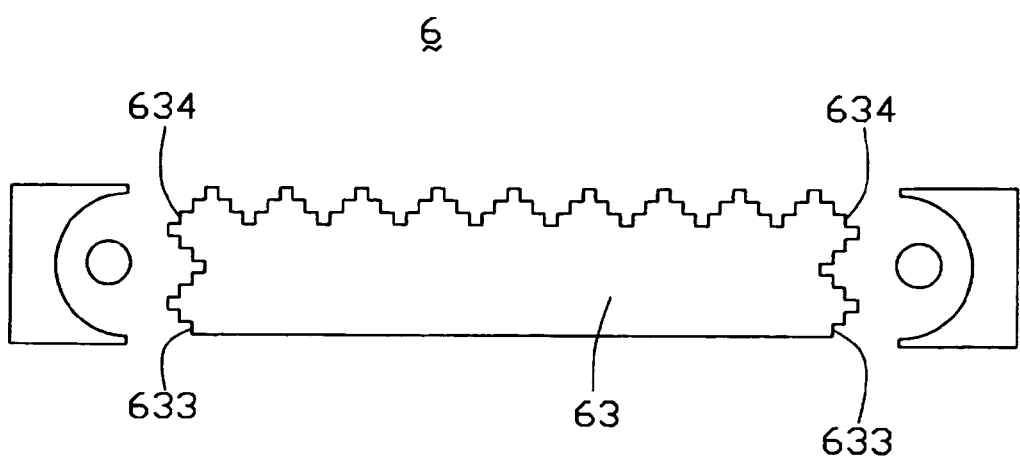
FIG. 5 is a side view of a backlight module according to a fourth embodiment of the present invention.

FIG. 5 illustrates a side view of a backlight module 6 according to a fourth embodiment. Compared with the backlight module 5 of FIG. 4, a light guide plate 63 of the backlight module 6 further comprises a plurality of stairway-shaped protrusions 634 respectively formed on two incident surfaces 633.

Figure 6:
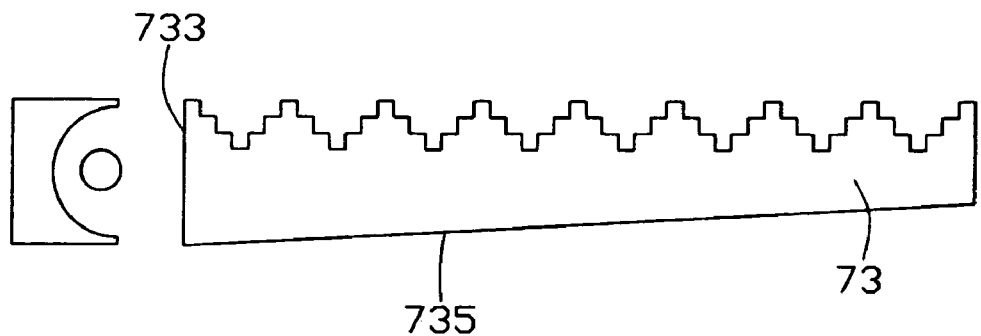
FIG. 6 is a side view of a backlight module according to a fifth embodiment of the present invention.

FIG. 6 is a side view of a backlight module 7 according to a fifth embodiment. Compared with the backlight module 3 of FIG. 2, a light guide plate 73 of the backlight module 7 has a bottom surface 735 inclined to an incident surface 733.

Figure 7:
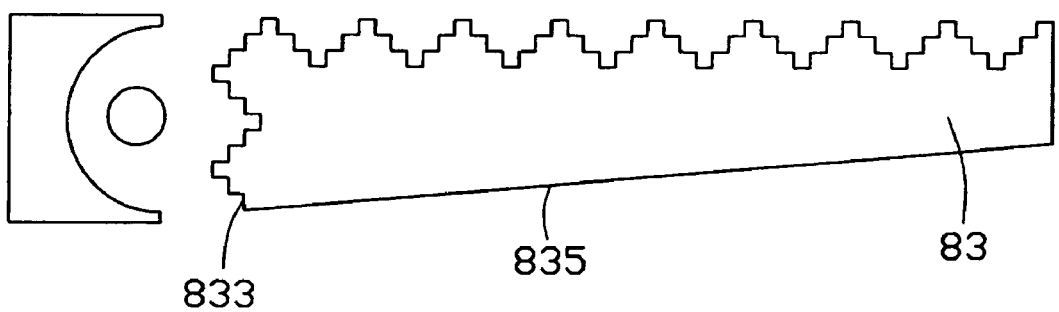
FIG. 7 is a side view of a backlight module according to a sixth embodiment of the present invention.

FIG. 7 illustrates a side view of a backlight module 8 according to a sixth embodiment. Compared with the backlight module 4 of FIG. 3, a light guide plate 83 of the backlight module 8 has a bottom surface 835 which is inclined to an incident surface 833.

Figure 8:
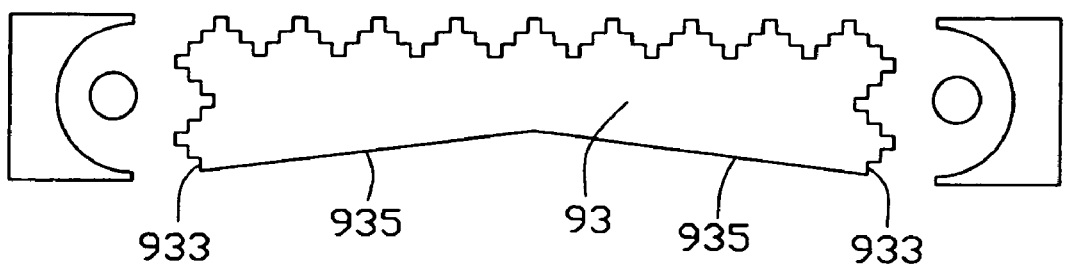
FIG. 8 is a side view of a backlight module according to a seventh embodiment of the present invention.

FIG. 8 illustrates a side view of a backlight module 9 according to a seventh embodiment. Compared with the backlight module 6 of FIG. 5, a light guide plate 93 of the backlight module 9 has a double-inclined bottom surface 935, inclined to two opposite incident surfaces 933, respectively.

Figure 9:
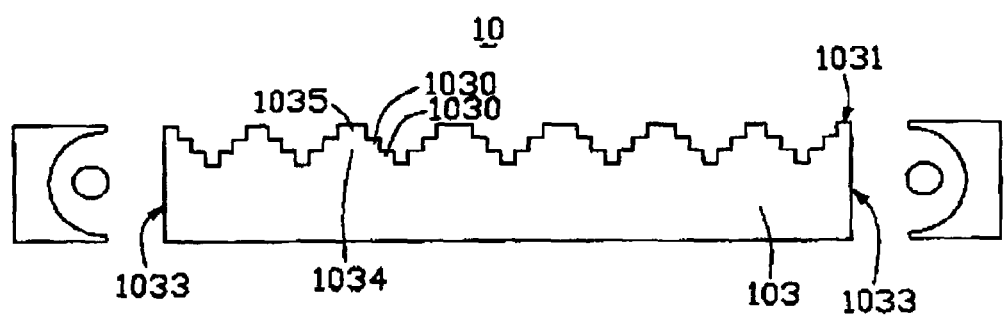
FIG. 9 is a side view of a backlight module according to an eighth embodiment of the present invention.

FIG. 9 illustrates a side view of a backlight module 10 according to an eighth embodiment. Compared with the backlight module 5 of FIG. 4, a light guide plate 103 of the backlight module 10 has an emitting surface 1031, two opposite incident surfaces 1033, and a plurality of stairway-shaped protrusions 1034. Each stairway-shaped protrusion 1034 includes a plurality of rectangular steps 1030, which include atop rectangular step 1035. Widths of the cop rectangular steps 1035 gradually increase as a distance between the stairway-shaped protrusions 1034 and the nearest light incident surface 1033 increases.

Figure 10:
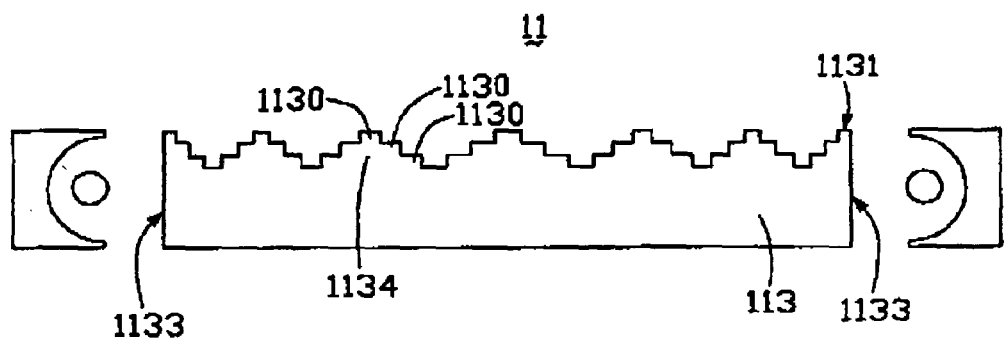
FIG. 10 is a side view of a backlight module according to a ninth embodiment of the present invention.
Figure 11:
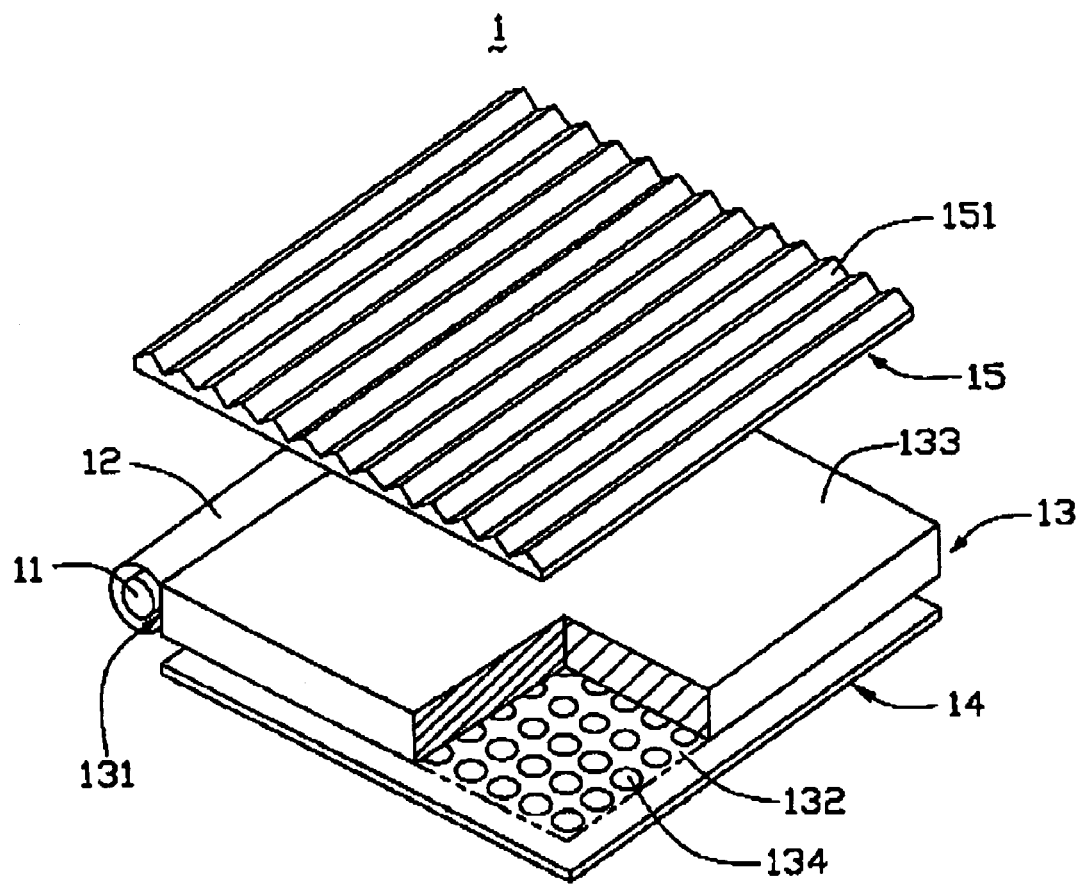
FIG. 11 is an exploded, perspective, cutaway view of a conventional backlight module.
Figure 12:
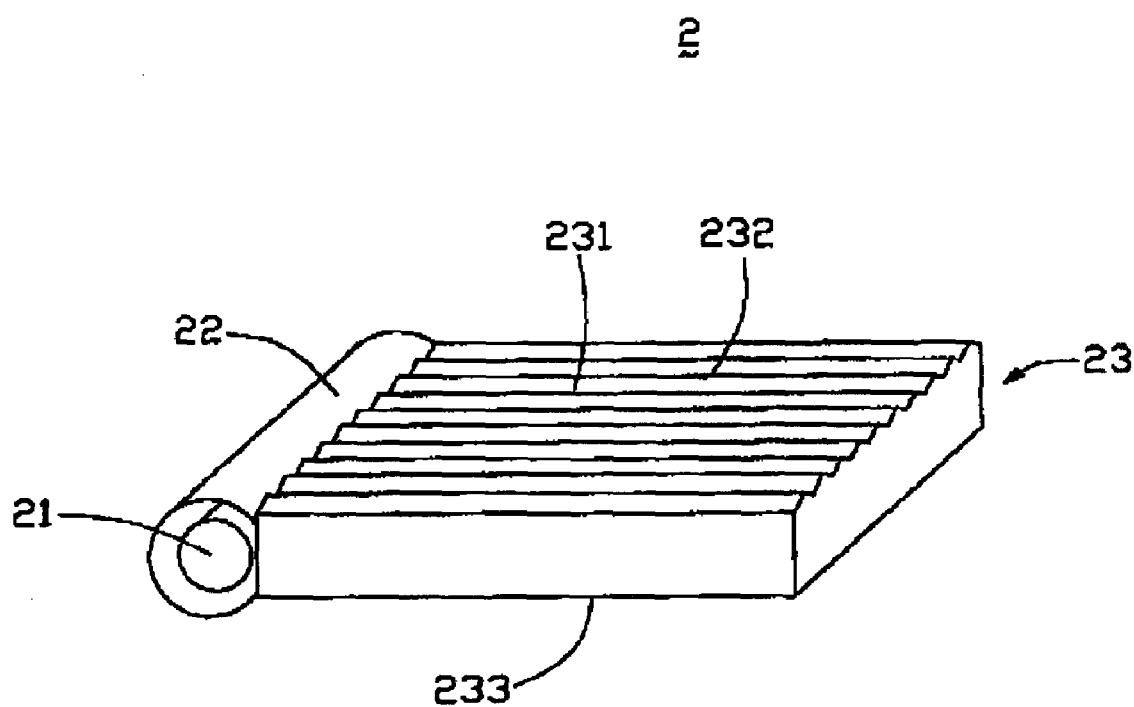
FIG. 12 is a perspective view of another conventional backlight module.

FIG. 10 illustrates a side view of a backlight module 11 according to a ninth embodiment. Compared with the backlight module 5 of FIG. 4, a light guide plate 113 of the backlight module 11 has an emitting surface 1131, two opposite incident surfaces 1133, and a plurality of stairway-shaped protrusions 1134. Each stairway-shaped protrusion 1134 includes a plurality of rectangular steps 1130. Widths of the rectangular steps 1130 gradually increase as a distance between the stairway-shaped protrusions 1134 and the nearest light incident surface 1133 increases.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A light guide plate for use with at least one light source, comprising:
   at least one incident surface for receiving incidence light beams from a corresponding light source;
   an emitting surface; and
   a bottom surface opposite to the emitting surface for scattering and reflecting the light beams in the light guide plate, and directing the light beams to the emitting surface; wherein
   a plurality of stairway-shaped protrusions are disposed on the emitting surface, and each of the stairway-shaped protrusions has a plurality of rectangular steps.

2. The light guide plate of claim 1, wherein the bottom surface is orthogonal to the at least one incident surface.

3. The light guide plate of claim 1, wherein the bottom surface is inclined to the at least one incident surface.

4. The light guide plate of claim 1, wherein a width of the rectangular steps is uniform.

5. The light guide plate of claim 1, wherein a width of the rectangular steps gradually increases as a distance between the protrusions and the nearest light incident surface increases.

6. The light guide plate of claim 1, wherein the at least one incident surface has a plurality of stairway-shaped protrusions thereon.

7. A backlight module, comprising:
   at least one light source; and
   a light guide plate comprising at least one incident surface for receiving light beams from a corresponding light source, an emitting surface, and a bottom surface opposite to the emitting surface for scattering and reflecting the light beams in the light guide plate, and directing the light beams to the emitting surface, a plurality of stairway-shaped protrusions being disposed on the emitting surface;
   wherein the at least one light source is provided adjacent to the at least one incident surface, respectively, and each of the stairway-shaped protrusions bas a plurality of rectangular steps.

8. The backlight module of claim 7, wherein the at least one bottom surface is orthogonal to the incident surface.

9. The backlight module of claim 7, wherein the at least one bottom surface is inclined to the at least one incident surface.

10. The backlight module of claim 7, wherein a width of the rectangular steps is uniform.

11. The backlight module of claim 7, wherein a width of the rectangular steps gradually increases as a distance between the protrusions and the nearest light incident surface increases.

12. The backlight module of claim 7, wherein the at least one incident surface has a plurality of stairway-shaped protrusions thereon.

13. A light guide plate used with at least one light source, comprising:

at least one incident surface for receiving incident light beams from a corresponding light source;

an emitting surface; and a bottom surface opposite to the emitting surface for scattering and reflecting the light beams in the light guide plate, and directing the light beams to the emitting surface; wherein a plurality of protrusions are side by side disposed on the emitting surface in a lateral direction, and each of said protrusions extends in a longitudinal direction perpendicular to said lateral direction and defines a plurality of tiny projections side by side arranged in said lateral direction on an exterior thereof; wherein each of said tiny projections extends along said longitudinal direction, and for each of said protrusions which has two oblique sides thereof, there are two sets of tiny projections located on said two oblique sides, respectively.

14. The light guide plate of claim 13, wherein the at least one bottom surface is orthogonal to the at least one incident surface.

15. The light guide plate of claim 13, wherein the at least one bottom surface is inclined to the at least one incident surface.

16. The light guide plate of claim 13, wherein a width of the rectangular steps is uniform.

17. The light guide plate of claim 13, wherein a width of the rectangular steps gradually increases as a distance between the protrusions and the nearest light incident surface increases.

18. The light guide plate of claim 13, wherein the at least one incident surface has a plurality of stairway-shaped protrusions thereon.

* * * * *